United States Patent
Sun et al.

(10) Patent No.: US 6,870,122 B2
(45) Date of Patent: Mar. 22, 2005

(54) ELECTRODE ALIGNMENT INSPECTOR AND METHOD

(75) Inventors: Peter C. Sun, Rochester Hills, MI (US); Pei-Chung Wang, Troy, MI (US); Ningjian Huang, Bingham Farms, MI (US); Kenneth R. Schmidt, Macomb, MI (US); Daniel C. Hutchinson, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 102 days.

(21) Appl. No.: 10/408,760

(22) Filed: Apr. 7, 2003

(65) Prior Publication Data

US 2004/0195214 A1 Oct. 7, 2004

(51) Int. Cl.⁷ ............................................. B23K 11/24
(52) U.S. Cl. ................................... 219/109; 219/86.41
(58) Field of Search ................................ 219/109, 110, 219/86.41

(56) References Cited

U.S. PATENT DOCUMENTS

| | | | |
|---|---|---|---|
| 6,084,195 A | * | 7/2000 | Swaggerty et al. ......... 219/109 |
| 6,151,124 A | | 11/2000 | Visscher |
| 6,184,487 B1 | | 2/2001 | Visscher |
| 6,696,660 B2 | * | 2/2004 | Nastasi, Jr. .................. 219/109 |
| 6,750,418 B1 | * | 6/2004 | Nastasi, Jr. .................. 219/109 |

OTHER PUBLICATIONS

Semtorg, Inc. Sales Publication "Tip Dress Verification Device", 1 sheet, date unknown.

* cited by examiner

Primary Examiner—Clifford C. Shaw
(74) Attorney, Agent, or Firm—Kathryn A. Marra

(57) ABSTRACT

Method and apparatus for detecting unacceptable misalignment of welding electrodes. An electrode-alignment station is positioned adjacent a welding station. A robot controls the movement of the electrodes, and occasionally moves the electrodes out of the welding station and into an electrode-alignment station. At the electrode-alignment station, the electrodes are closed on a fixture that transfers electrode-misalignment into movement of a plate that triggers an alarm if the misalignment is greater than a prescribed amount.

16 Claims, 6 Drawing Sheets

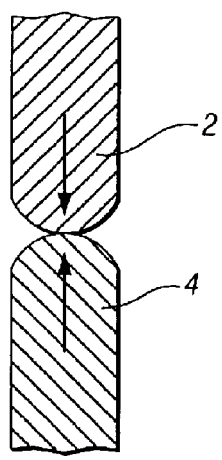
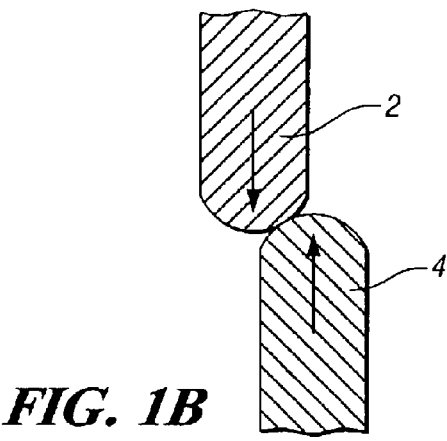
FIG. 1A  FIG. 1B
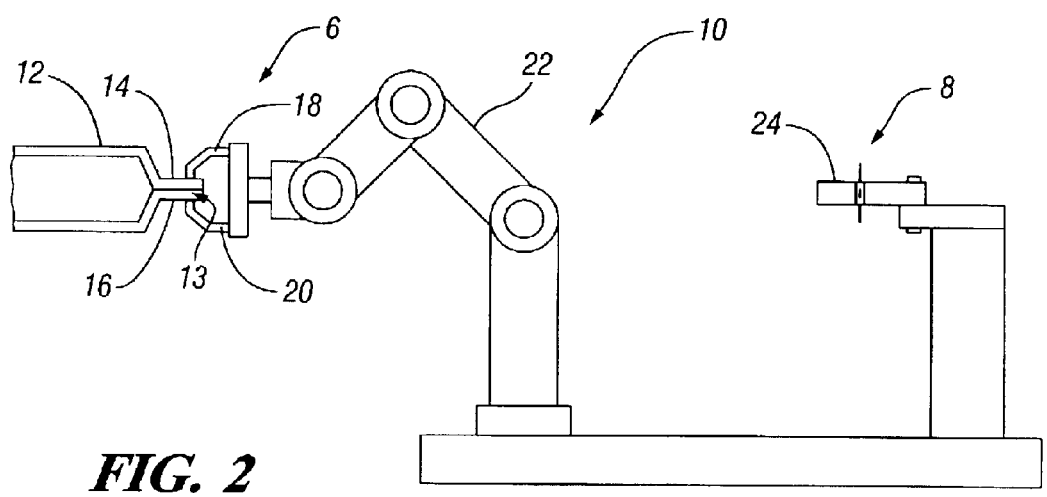
FIG. 2
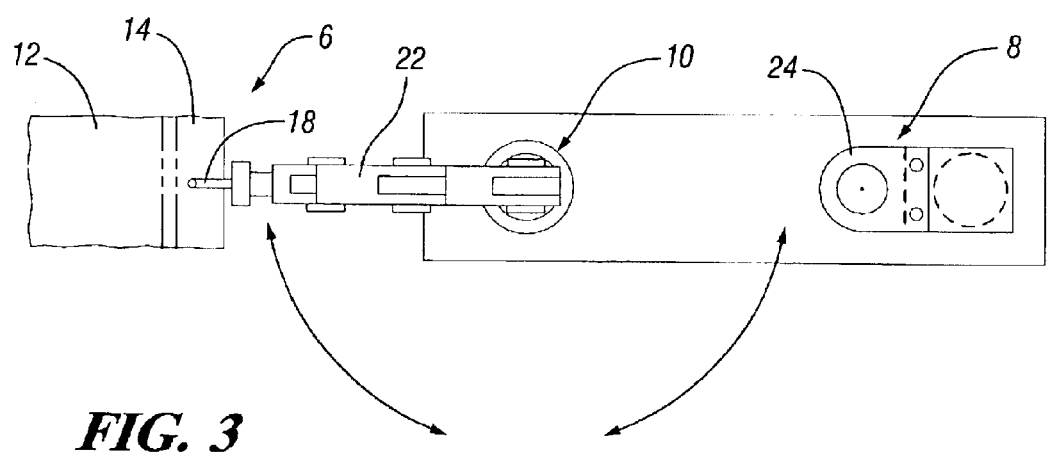
FIG. 3

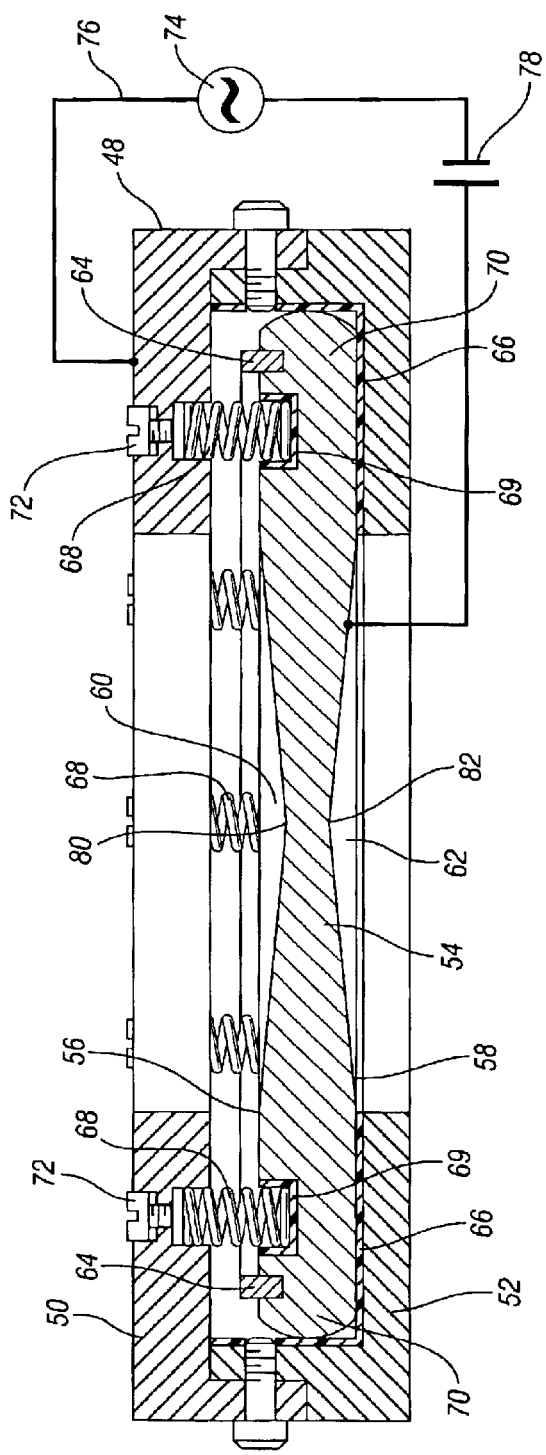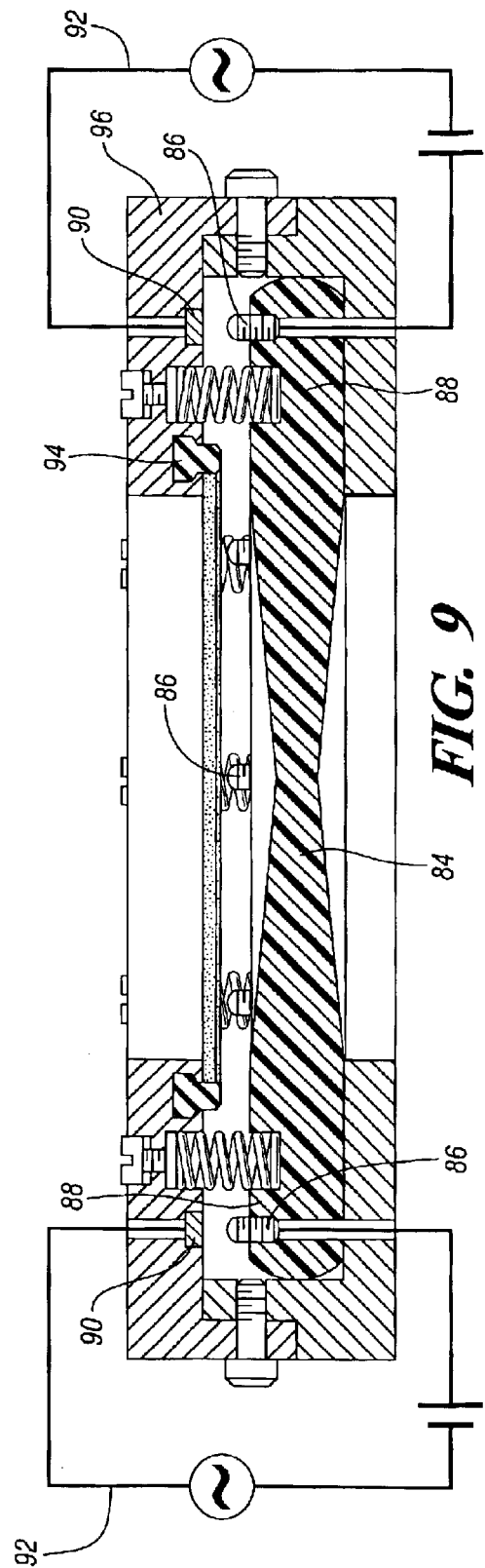

ELECTRODE ALIGNMENT INSPECTOR AND METHOD

TECHNICAL FIELD

This invention relates to method and apparatus for checking opposing welding electrodes for misalignment. The invention is particularly useful in determining misalignment of electrical resistance welding electrodes.

BACKGROUND OF THE INVENTION

Electrical resistance welding (e.g. spot welding, projection welding, etc.) is known, and involves squeezing/pinching the components of a work-piece to be welded between a pair of opposed electrodes, and passing sufficient electrical current through the electrodes and components to melt and fuse the components together.

It is also known to sequentially pass a series of work-pieces to be welded through a welding station, and to use a robot to move the welding electrodes into place in the welding station to make the weld. Thereafter, the robot moves the electrodes out of the way as another work-piece moves into the welding station. It is also known to periodically move the electrodes into an electrode dressing station to machine or otherwise shape the electrode tips to a prescribed configuration.

It is essential for weld quality that the welding electrodes be aligned with each other, and with the work-piece, within suitable tolerances. Unfortunately, such tolerances are sometimes exceeded in the course of welding numerous work-pieces one after the other, or between production runs, incident to the welding equipment being damaged through rough handling, violent contact with fixtures, or incorrect presentation to the work-piece which can result in the electrodes being forced out of alignment with each other and with the work-piece.

Heretofore, alignment of the welding electrodes has been determined either by occasional visual inspection of the electrodes by equipment operators or maintenance persons, or by the observance of poor welds on the work-piece downstream of the welding station. The present invention provides a method and apparatus for the automatic mechanized inspection of electrode alignment, and signaling of the welding operator when untoward misalignment exceeds a prescribed amount.

SUMMARY OF THE INVENTION

The present invention contemplates a welding method and apparatus involving a welding station having pair of aligned, electrical resistance welding electrodes having an interelectrode gap in which the welding takes place. A series of work-pieces to be welded are passed through the gap, and therein pinched between the electrodes while sufficient electrical current is passed through the electrodes and work-pieces to fuse the work-pieces together. Occasionally throughout a welding run, the electrodes are moved out of the welding station (e.g. by a robot) and into an adjacent, electrode-alignment checking station to check the alignment of the electrodes with each other and with the work-piece. The electrode-alignment station has an inspection fixture having a reference target against which alignment, or misalignment, of the electrodes is determined. The electrodes are positioned in the electrode-alignment station so as to locate the electrodes opposite the target. The target, in turn, is positioned in the alignment station such that when the electrodes are registered with the target, they will be aligned (1) with each other, and (2) with the weld site on the work-piece when the robot moves the electrodes back into the welding station. In the electrode-alignment station, the electrodes are brought together to engage the inspection fixture which triggers an alarm if the electrodes are misaligned from the target (i.e. "off-target") by more than a prescribed amount. Preferably, the inspection fixture comprises an electrode-misalignment detector comprising a moveable plate (preferably a disk) having the alignment target at its center, and a peripheral portion, outboard the target, which moves to trigger the alarm when sufficiently misaligned electrodes are closed on the plate. According to one embodiment, the closed electrodes cause the plate to move laterally. According to another embodiment, the closed electrodes cause the plate to slant from its "at rest" position.

The present invention also contemplates an inspection fixture for use with the aforesaid welding method that is adapted to detect unacceptable misalignment of opposing welding electrodes. The inspection fixture comprises a housing and a plate mounted for movement in the housing when it is engaged by misaligned electrodes. The plate has (1) a reference target at its center against which the electrodes are registered at the beginning of a welding sequence (i.e. the electrodes are aligned along a target-line that passes through the target perpendicular to the plate), and (2) a peripheral portion that is outboard the target and is displaceable when one or both of the electrodes forcibly engage the plate off-target. The housing carries at least one (preferably more) displacement-detector(s) adjacent the peripheral portion of the moveable plate to detect such displacement of the peripheral portion as is above a prescribed limit indicative of unacceptable electrode misalignment. An alarm, responsive to the displacement-detector, signals the need for realignment of the electrodes when unacceptable displacement of the peripheral portion occurs.

According to one embodiment, the moveable plate has a conical depression formed in one of its faces and surrounding the target. The conical depression is defined by a wall that slopes inwardly toward the target to provide a camming surface against which a misaligned electrode reacts to laterally displace the plate when the electrodes are forcibly closed on the plate.

According to a variation of this embodiment, the inspection fixture comprises a pair of abutting such plates that slide relative to each other along an interfacial plane that is perpendicular to the target-line. Both plates have a conical depression surrounding the target each for receiving one of the electrodes. The plates slide relative to each other when forcibly engaged by off-target electrodes.

The displacement-detector may comprise any of a variety of sensors, but will preferably comprise either a pressure transducer, or an electrical contact engageable by an electrical contact on the plate to trigger the alarm. According to one embodiment of an electrical-contact-type displacement-detector, the detector will preferably comprise a contact ring that is centric with the target-line and acts, as a switch, with a contact ring on the peripheral portion of the plate According to still another embodiment of the invention an inspection fixture is provided wherein: (1) the moveable plate has first and second opposing faces; (2) the fixture includes at least one first spring extending between the housing and at least the first face for elastically separating the peripheral portion of the plate from a first displacement-detector; and (3) the plate is adapted to slant sufficiently from its rest position toward the first displacement-detector to engage the peripheral portion with the displacement-detector and thereby trigger the alarm when the electrodes are unacceptably misaligned. A preferred variation of this embodiment includes at least one second spring extending between the housing and the second face of the plate for elastically separating the peripheral portion of the plate from a second displacement-detector. The plate is adapted to slant sufficiently from its at rest position toward the second displacement-detector to engage the peripheral portion with the second displacement-detector and thereby trigger the alarm. Preferably, adjusting screws are provided at the ends of each spring for varying the spring's compression, and thereby varying the amount of misalignment tolerable by the fixture before triggering the alarm. The fixture will preferably includes a damper between the plate and the housing for cushioning the impact of the electrical contacts on each other when the switch is closed by misaligned electrodes.

The invention will be better understood when considered in the light of the following detailed description of certain specific embodiments thereof which is given hereafter in conjunction with the following drawings in which:

BRIEF DESCRIPTION OF THE DRAWINGS

FIGS. 1A and 1B depict aligned and misaligned electrodes respectively;

FIG. 2 depicts, in simplified fashion, a welding station and adjacent electrode-alignment station;

FIG. 3 is a top view of FIG. 2;

FIG. 8 is a side, sectional view in the direction of 8—8 of FIG. 7;

FIG. 9 is a side, sectional view of still another embodiment of the invention which is a variation of the embodiment shown in FIG. 8;

DESCRIPTION OF THE PREFERRED EMBODIMENT

Figure 4:
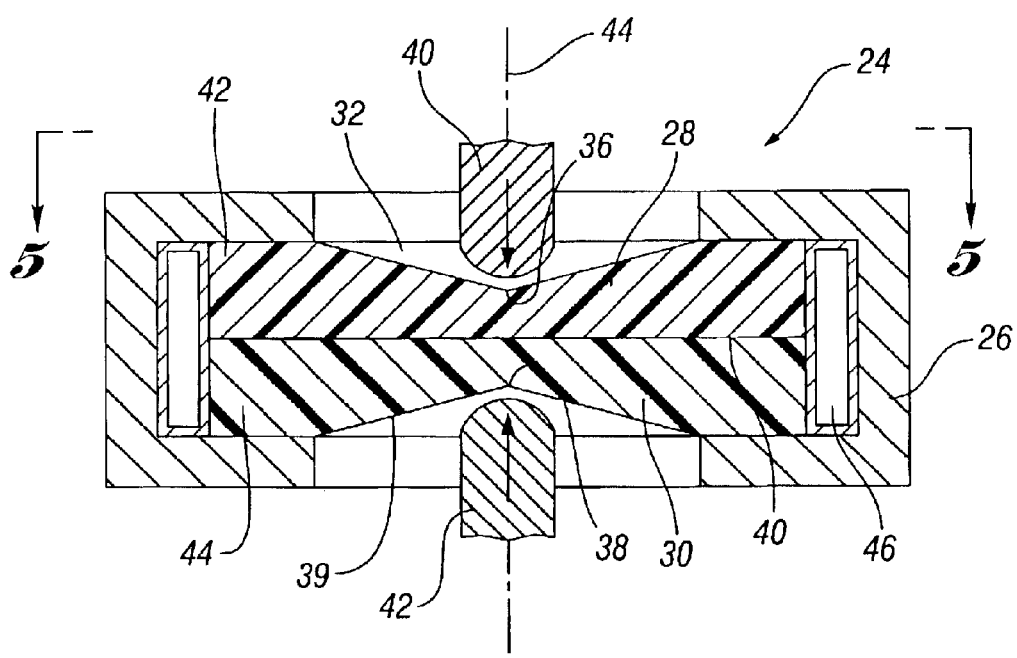
FIG. 4 is a side, sectional view in the direction of 4—4 of FIG. 5.

FIG. 1A depicts a pair of opposing electrical resistance welding electrodes 2, 4 aligned one with the other. FIG. 1B depicts the same electrodes 2 and 4, but misaligned.

FIGS. 2 and 3 depict, a segment of a production line where welding occurs. The station depicted in the drawings has only a single pair of opposed welding electrodes (i.e. a single welding gun). In practice however, such stations often have multiple such welding guns, and such multi-gun welding stations are within the scope of the present invention. More particularly, FIGS. 2 and 3 show a welding station 6, an adjacent electrode-alignment station 8 and a robot 10 for moving the welding electrodes in and out of the welding and electrode-alignment stations. In operation, a work-piece 12 moves into the welding station 6 with flanges 14 and 16 to be welded positioned in a gap 13 between the welding electrodes 18 and 20 which are carried by an arm 22 of the robot 10. In the welding station 6, the flanges 14 and 16 are squeezed between the electrodes 18 and 20 and welding current passed therethrough. After the weld is made, the robot 10 rotates the arm 22 (and hence the electrodes 18 and 20) out of the welding station 6 to allow removal of the work-piece 12. Thereafter, a new work-piece 12 moves into the welding station 6, and the robot 10 rotates the arm 22 back into the welding station 6 for welding the new work-piece 12. This process is repeated over and over many times in the course of a production run. From time to time, it is desirable to check the alignment of the electrodes 18 and 20 with respect to each other, and with respect to their location in the welding station 6 relative to the work-piece 12. To this end, the robot 10 is programmed to rotate the electrodes 18 and 20 into the electrode-alignment station 8 to check the alignment of the electrodes 18 and 20 with respect to each other and to the welding station 6. In this regard, the electrode-alignment station 8 includes an inspection fixture 24 rigidly mounted in a location selected to preferably mirror the location of the flanges 14 and 16 in the welding station 6 such that when the electrodes 18 and 20 are aligned with the fixture 24 they will likewise be properly aligned with respect to the flanges 14 and 16 of the work-piece 12 in the welding station 6. The location of the fixture 24 may be other than a mirror position, and the robot programmed to coordinate electrode registration between the alignment station 8 and the welding station 6. This latter alternative is particularly applicable to multi-gun welding equipment wherein the robot may be programmed to present all of the guns to a single inspection fixture or to multiple inspection fixtures positioned to coordinate electrode registration between the alignment station and the welding station.

In the electrode-alignment station 8, the electrodes 18 and 20 are closed to pinch the inspection fixture 24 therebetween. The inspection fixture 24, in turn, is designed (1) to determine if the electrodes are sufficiently out of alignment with each other, or the work-piece, as to produce poor welds, and (2) to trigger an alarm (e.g. audible or visual) to alert the welding operator that alignment of the electrodes 18 and 20 is needed. Specific examples of such inspection fixture 24 will be discussed hereinafter. For the moment however, suffice to say the fixture 24 includes a reference target at its center against which the electrodes are registered at the beginning of a welding sequence (e.g. start of a production run). After the electrodes have been properly registered with the target, they are returned to the welding station 6 for sequentially welding a plurality of work-pieces. Thereafter the electrodes are occasionally returned to the electrode-alignment station 8 to check and see if the electrodes' alignment remains within acceptable tolerances.

Figure 5:
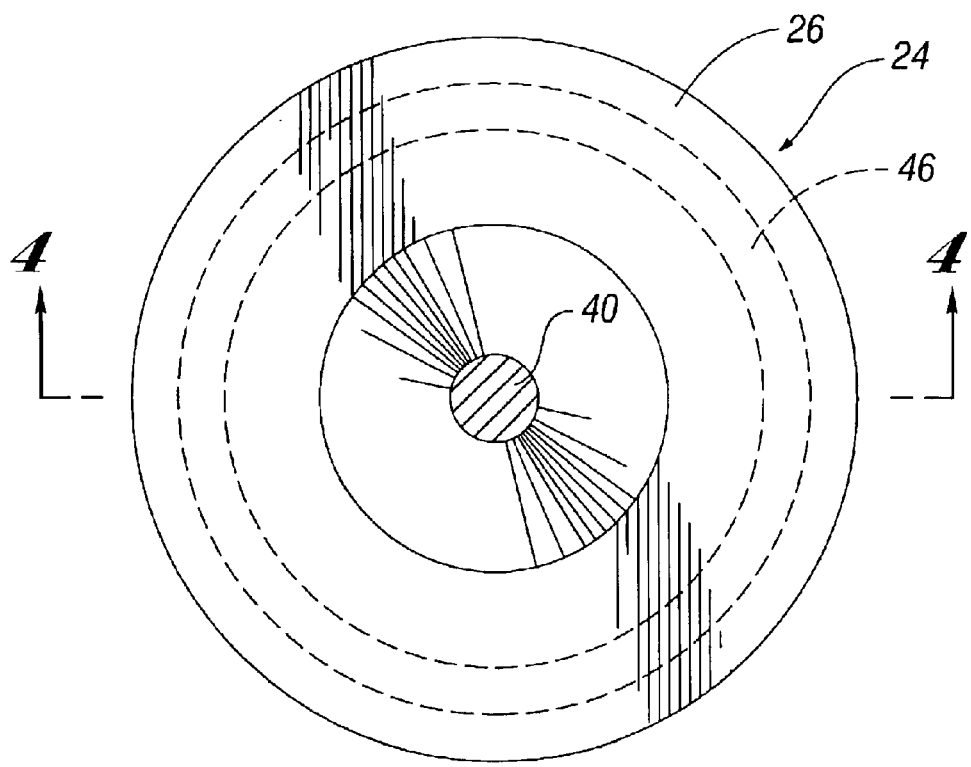
FIG. 5 is a plan view of FIG. 4.
Figure 6:
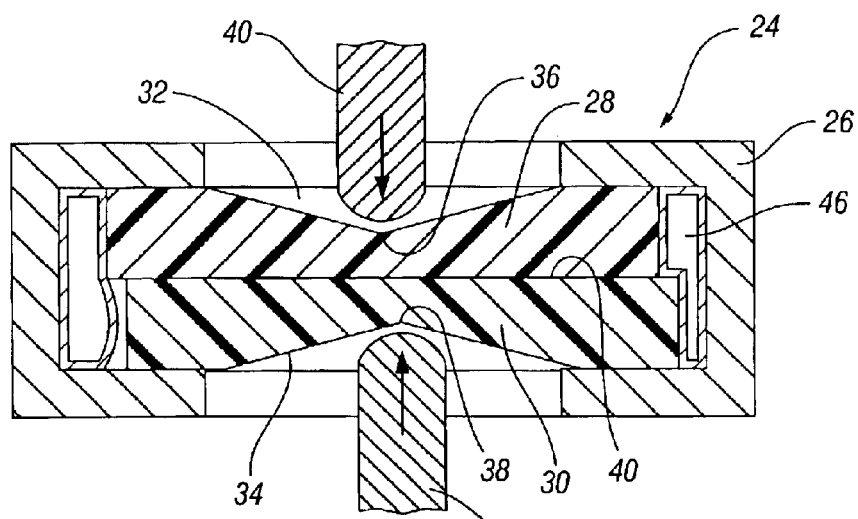
FIG. 6 is a view similar to FIG. 4 but depicting, in exaggerated fashion, misaligned electrodes and compressed pressure transducer.

FIGS. 4–6 depict one embodiment of an inspection fixture in accordance with the present invention. FIGS. 4–6 depict an inspection fixture 24 having a housing 26 encasing a pair of relatively slidable disk-shaped plates 28 and 30. The plates 28 and 30 each have a conical depression 32 and 34 respectively in their exposed faces for receiving the electrodes 40 and 42. The pieces 36 and 38 of the conical depressions 32 and 34 serve as targets for aligning the electrodes 40 and 42 along a target line 44. The plates 28 and 30 are slidable relative to each other along an interfacial slide plane 40 and comprise a peripheral portion 42 and 44, respectively, lying outboard the targets 36, 38. One or more displacement-detectors 46 surround(s) the peripheral portions 42 and 44 of the plates 28 and 30 and serve(s) to determine if the plates 28 and 30 move laterally more than a prescribed amount when pinched between the electrodes 40 and 42. In the embodiment shown in FIGS. 4–6, the displacement-detector comprises an annular load cell (i.e. pressure transducer) that deforms minutely (shown exaggerated in FIG. 6) when pressurized by the sliding of the plates 28 and 30 relative to each other. The conical depressions 32 and 34 in the plates 28 and 30 are defined by walls that slope inwardly toward the targets 36 and 38, and provide a camming surface against which the electrodes 40 and 42 react when they are misaligned. In this regard when the targets and the electrodes are aligned with the target line 44 (see FIG. 4), no lateral movement of the plates 28 or 30 occurs. However and as best depicted in FIG. 6, when the electrodes 40 and 42 are misaligned, they will miss one or both of the targets 36, 38 and engage the sidewall of the depression. When pinching force is applied to the electrodes 40 and 42, camming action forces the plates 28 and 30 to slide relative to each other as illustrated in FIG. 6. This camming/sliding action is best achieved by using plates 28 and 30 that comprise a highly lubricious material such as polytetrafluoroethylene, or other similar fluorocarbons, or the like.

Figure 7:
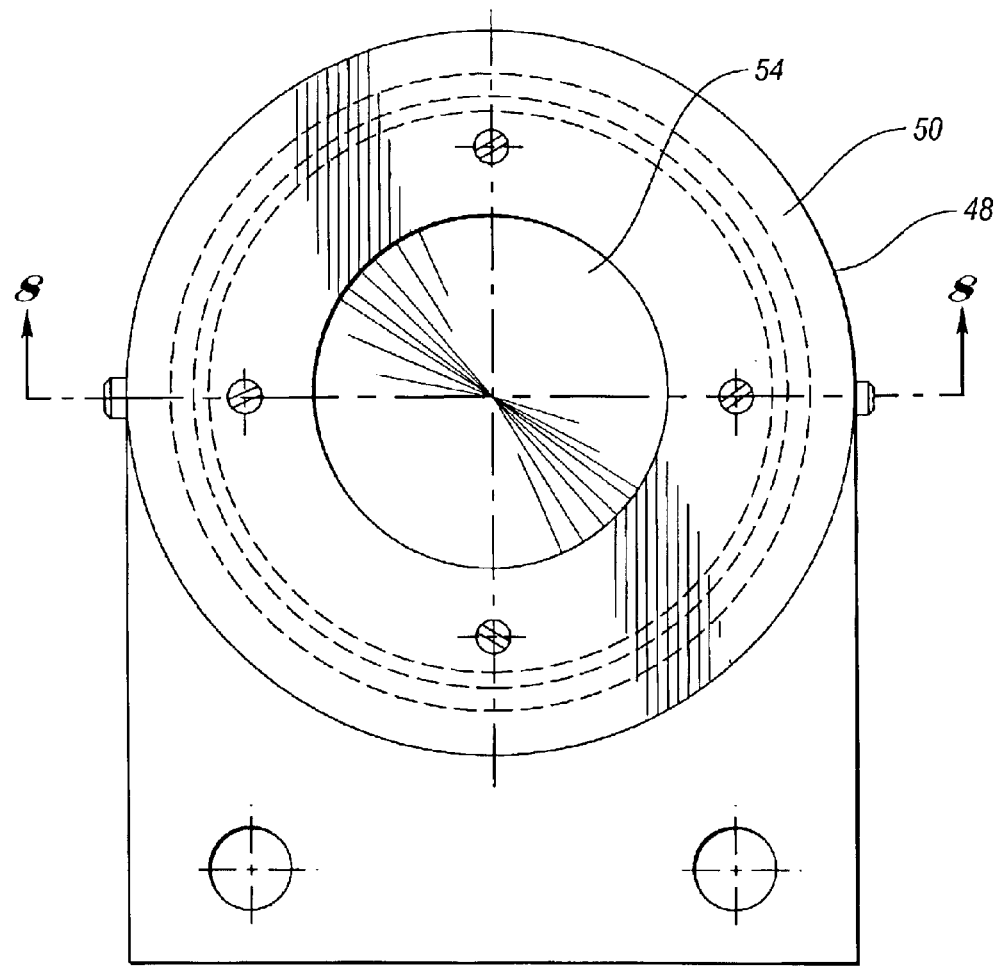
FIG. 7 is a plan view of another embodiment of the invention.

FIGS. 7 and 8 depict another embodiment of the present invention. More specifically, FIGS. 7 and 8 depict an inspection fixture comprising a housing 48 formed from two nesting sections 50 and 52, bolted together as shown. The housing 48 encases a movable plate 54 (shown in its "at rest" position) having first and second faces 56 and 58, each having a conical depression 60 and 62 respectively therein. The plate 54 comprises an electrically conductive material (e.g. metal), and carries an electrical contact in the form of a ring 64 on the peripheral portion 70 of the plate 54. Insulation 66 electrically insulates the plate 54 from the housing 48. Springs 68 elastically separate the peripheral portion 70 of the plate 54 from the housing 48. Insulation 69 electrically insulates the springs 68 from the plate 54. Adjusting screws 72 allow for adjustment of the compression on the springs 68 for adjusting/setting the inspection fixture to the prescribed amount of tolerable misalignment. An alarm 74 is electrically connected to the housing 48 and the plate 54 by means of a circuit 76 that includes a battery or other source of electricity 78. The plate 54 includes targets 80 and 82 for registering the electrodes. When the electrodes are "on target", no movement of the plate 54 occurs. However when the electrodes are "off target", the plate 54 slants (i.e. tilts from its at rest position) so as to move the contact ring 64 closer to the housing 48. If the extent of electrode misalignment is severe enough, the contact ring 64 will engage the housing 48 and close the circuit 76, thereby causing the alarm 74 to go off to alert the operator that electrode alignment is required.

FIG. 9 depicts another embodiment of the invention similar to that of FIG. 8. FIG. 9, however, employs a non-conductive plate 84 that carries a plurality of electrical contacts 86 on its peripheral portion 88. The contacts 86 carried by the plate 84, will engage contacts 90 on the housing 96, and close an alarm circuit 92, when the plate 84 slants enough to indicate that the electrodes are unacceptably misaligned. An annular, elastomeric bumper/damper 94 is carried by the housing 96 to dampen the impact of the contacts 86 on the contacts 90.

Figure 10:
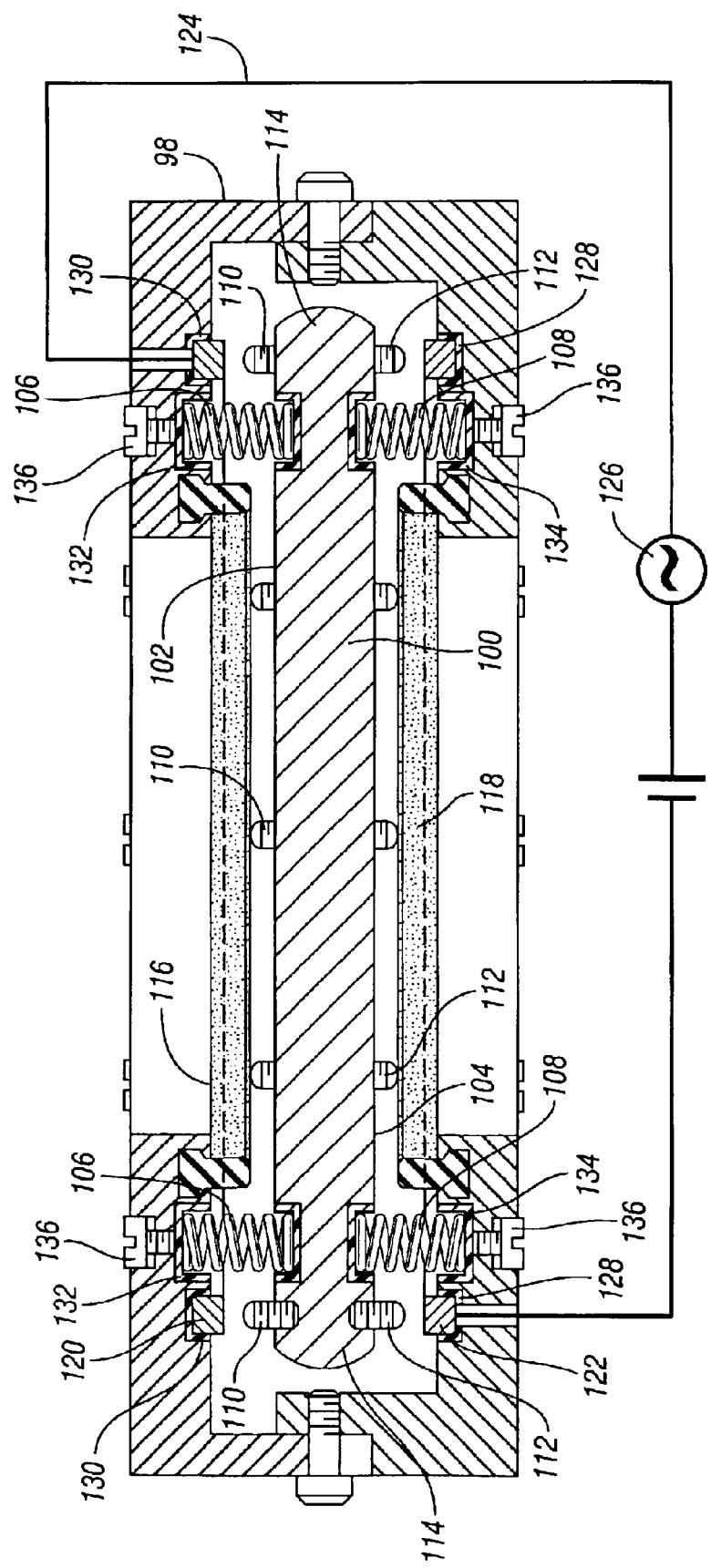
FIG. 10 is a side, sectional view of still another embodiment of the present invention.

FIG. 10 depicts still another embodiment of the present invention and depicts a housing 98 encasing a floating plate 100 suspended between springs 106 and 108. The floating plate 100 has a first face 102 and a second face 104. A plurality of first springs 106 extend between the housing 98 and the first face 102 and a plurality of second springs 108 extend between the second face 104 and the housing 98. A plurality of electrical contacts 110 and 112 are embedded in the peripheral portion 114 of the plate 100. The center of the plate 100 serves as the alignment target for the electrodes and may be scored or etched with a suitable marking (e.g. an X). Annular elastomeric dampers 116 and 118 are provided to dampen the impact of contacts 110 and 112 on ring contacts 120 and 122 carried by the housing 98. Sufficiently misaligned electrodes will cause the plate 100 to slant sufficiently to cause a contact 112 to engage the ring contact 122, and a contact 110 to engage the ring contact 120 thereby completing the alarm circuit 124 and triggering the alarm 126. In this embodiment, the plate 100 is made from a conductive material (e.g. metal). Insulation 128 isolates the ring contact 122 from the housing 98 while insulation 130 insulates the ring contact 120 from the housing 98. Similarly, insulation 132 insulates the springs 106 from the housing 98, and insulation 134 insulates the springs 108 from the housing 98. Adjusting screws 136 adjust the compression on the springs 106,108 for setting the fixture to the desired tolerance.

Figure 11:
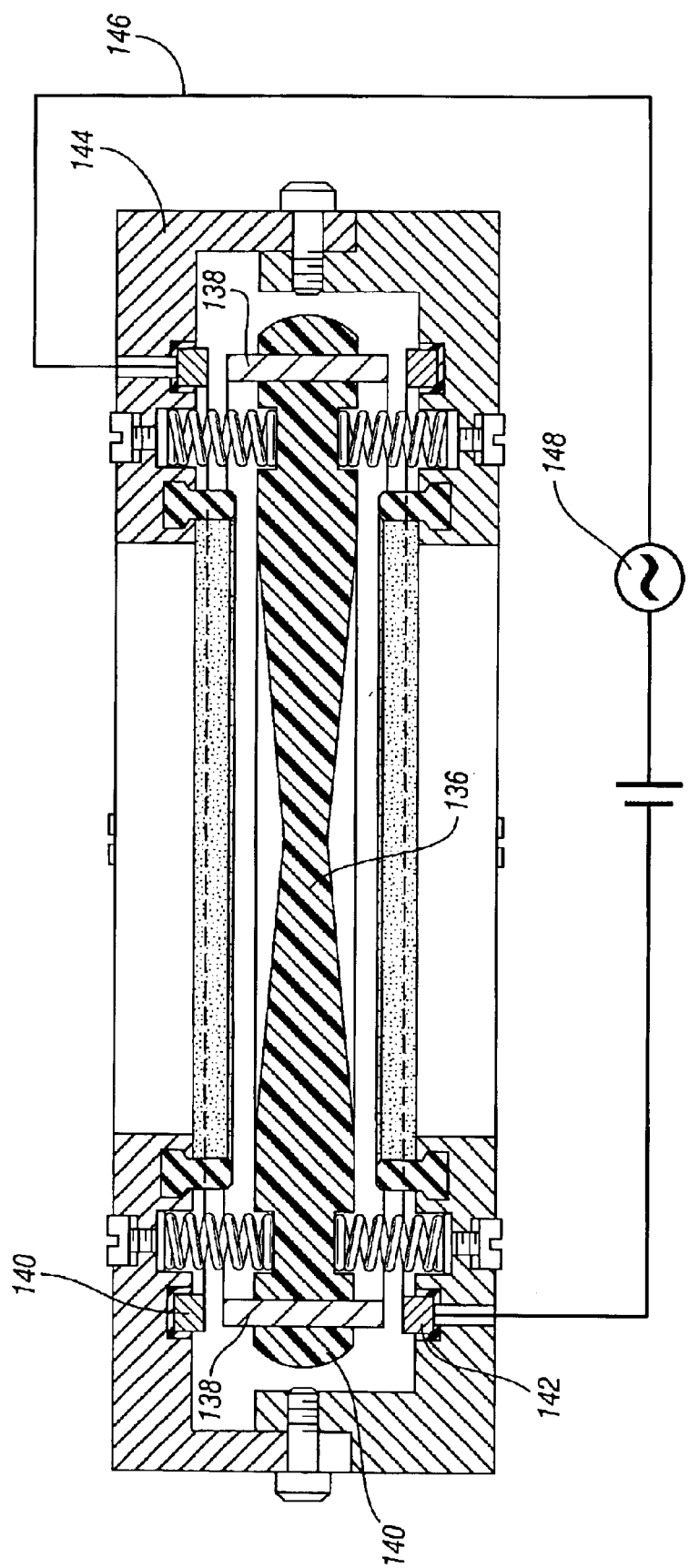
FIG. 11 depicts a side, sectional view of still another embodiment of the present invention similar to that shown in FIG. 10.

The embodiment shown in FIG. 11 is similar to that shown in FIG. 10 with the principal exception being that the floating plate 136 comprises an insulating material and carries a ring contact 138 on its peripheral portion 140. Canting of the plate 136 incident to the force supplied by sufficiently misaligned electrodes, causes the ring contact 138 to engage the ring contacts 140 and 142 carried by the housing 144 to thereby close the warning circuit 146 and trigger the alarm 148.

While the invention has been described in terms of certain specific embodiments thereof, it is not intended to be limited thereto, but rather only to the extent set forth hereafter in the claims which follow.

What is claimed is:

1. An inspection fixture for detecting unacceptable misalignment of opposing welding electrodes, said fixture comprising: a housing; a plate mounted in said housing and adapted for movement when engaged by misaligned said electrodes, said plate having a target at its center for registering said electrodes at the beginning of a welding sequence, and a peripheral portion outboard said target and adapted for displacement when misaligned said electrodes forcibly engage said plate; at least one displacement-detector carried by said housing adjacent said peripheral portion for detecting displacement of said peripheral portion that is indicative of unacceptable electrode misalignment; and an alarm responsive to said displacement-detector for signaling the need for realignment of said electrodes when said unacceptable displacement is detected.

2. An inspection fixture according to claim 1 comprising a plurality of said displacement-detectors around said target adjacent said peripheral portion.

3. An inspection fixture according to claim 1 wherein said plate has first and second opposing faces, and said fixture includes at least one first spring extending between said housing and at least said first face for elastically separating said peripheral portion from a first said displacement-detector, said plate being adapted to cant sufficiently toward said first displacement-detector to engage said peripheral portion with said displacement-detector and thereby trigger said alarm when said electrodes are unacceptably misaligned.

4. Welding method comprising the steps of: providing a welding station having pair of aligned electrical resistance welding electrodes defining an inter-electrode gap; passing a series of work-pieces to be welded through said gap;

pinching each of said work-pieces between said electrodes in said gap while passing electrical current through said electrodes and said work-pieces to produce a plurality of welds at said welding station; occasionally moving said electrodes out of said welding station and into an electrode-alignment station adjacent said welding station to check alignment of said electrodes, said electrode-alignment station having an inspection fixture comprising a plate having a peripheral portion surrounding a central reference target against which alignment or misalignment is determined, and a plate-displacement detector; positioning said electrodes in said alignment station so as to locate said electrodes opposite said target; closing said electrodes so as to forcefully engage said plate and displace said plate if said electrodes are misaligned, and trigger an alarm if said plate is displaced sufficiently to indicates that said electrodes are misaligned by a prescribed amount or more.

5. An inspection fixture for detecting unacceptable misalignment of opposing welding electrodes, said fixture comprising: a housing; a plate mounted in said housing and adapted for movement when engaged by misaligned said electrodes, said plate having a target at its center for registering said electrodes at the beginning of a welding sequence, and a peripheral portion outboard said target and adapted for displacement when misaligned said electrodes forcibly engage said plate, said plate having a conical depression surrounding said target and defined by a wall that slopes inwardly toward said target to provide a camming surface against which a said electrode reacts to laterally displace said peripheral portion when said electrodes are forcefully closed on said plate and are misaligned from said target; at least one displacement-detector carried by said housing adjacent said peripheral portion for detecting displacement of said peripheral portion that is indicative of unacceptable electrode misalignment; and an alarm responsive to said displacement-detector for signaling the need for realignment of said electrodes when said unacceptable displacement is detected.

6. An inspection fixture according, to claim 5 wherein said displacement-detector comprises a pressure transducer engagable by said peripheral portion.

7. An inspection fixture for detecting unacceptable misalignment of opposing welding electrodes, said fixture comprising: a housing; a pair of plates abutting each other at an interfacial plane within said housing, said plates being adapted for movement when engaged by misaligned said electrodes, each said plate having a target at its center for registering said electrodes at the beginning of a welding sequence, and a peripheral portion outboard said target and adapted for displacement when misaligned said electrodes forcibly engage said plate and a conical depression in each said plate surrounding said target, each said conical depression being defined by a wall that slopes inwardly toward said target to provide a camming surface against which a said electrode reacts to laterally displace said peripheral portion when said electrodes are forcefully closed on said plate and are misaligned from said target; at least one displacement-detector carried by said housing adjacent said peripheral portion for detecting displacement of said peripheral portion that is indicative of unacceptable electrode misalignment; and an alarm responsive to said displacement-detector for signaling the need for realignment of said electrodes when said unacceptable displacement is detected.

8. An inspection fixture for detecting unacceptable misalignment of opposing welding electrodes, said fixture comprising: a housing; a plate having first and second opposing faces mounted in said housing and adapted for movement when engaged by misaligned said electrodes, said plate having a target at its center for registering said electrodes at the beginning of a welding sequence, and a peripheral portion outboard said target and adapted for displacement when misaligned said electrodes forcibly engage said plate; at least one displacement-detector carried by said housing adjacent said peripheral portion for detecting displacement of said peripheral portion that is indicative of unacceptable electrode misalignment; at least one first spring extending between said housing and at least said first face for elastically separating said peripheral portion from a first said displacement-detector; at least one second spring extending between said housing and said second face for elastically separating said peripheral portion from a second said displacement-detector; and an alarm responsive to said displacement-detector for signaling the need for realignment of said electrodes when said unacceptable displacement is detected; wherein said plate is adapted to cant sufficiently to engage said peripheral portion with one of said displacement-detectors and thereby trigger said alarm when said electrodes are unacceptably misaligned.

9. An inspection fixture for detecting unacceptable misalignment of opposing welding electrodes, said fixture comprising: a housing; a plate having first and second opposing faces mounted in said housing and adapted for movement when engaged by misaligned said electrodes, said plate having a target at its center for registering said electrodes at the beginning of a welding sequence, and a peripheral portion outboard said target and adapted for displacement when misaligned said electrodes forcibly engage said plate; at least one displacement-detector carried by said housing adjacent said peripheral portion for detecting displacement of said peripheral portion that is indicative of unacceptable electrode misalignment; at least one first spring extending between said housing and at least said first face for elastically separating said peripheral portion from a first said displacement-detector; an alarm responsive to said displacement-detector for signaling the need for realignment of said electrodes when said unacceptable displacement is detected; and at least one adjusting screw operatively associated with said housing so as to bear on said at least one spring for varying the compression of said spring and thereby varying the amount of misalignment tolerable by the fixture before triggering said alarm; wherein said plate is adapted to cant sufficiently toward said first displacement-detector to engage said peripheral portion with said first displacement-detector and thereby trigger said alarm when said electrodes are unacceptably misaligned.

10. An inspection fixture for detecting unacceptable misalignment of opposing welding electrodes, said fixture comprising: a housing; a plate having first and second opposing faces mounted in said housing and adapted for movement when engaged by misaligned said electrodes, said plate having a target at its center for registering said electrodes at the beginning of a welding sequence, and a peripheral portion outboard said target and adapted for displacement when misaligned said electrodes forcibly engage said plate; at least one displacement-detector carried by said housing adjacent said peripheral portion for detecting displacement of said peripheral portion that is indicative of unacceptable electrode misalignment, said displacement-detector comprising one contact of an electrical switch, and said peripheral portion comprising another contact of said switch; at east one first spring extending between said housing and at least said first face for elastically separating said peripheral portion from a first said displacement-detector; and an alarm responsive to said displacement-detector for signaling the need for realignment of said electrodes when said unacceptable displacement is detected; wherein said plate is adapted to cant sufficiently to engage said peripheral portion with a said displacement-detector and thereby trigger said alarm when said electrodes are unacceptably misaligned.

11. An inspection fixture according to claim 10 wherein said fixture includes a damper between said plate and said housing for cushioning the impact of said contacts on each other when said switch is closed.

12. An inspection fixture according to claim 11 wherein said damper is carried by said housing.

13. An inspection fixture according to claim 10 wherein at least one of said contacts is a ring centric with said target.

14. An inspection fixture according to claim 13 wherein both of said contacts are rings concentric with said target.

15. Welding method comprising the steps of: providing a welding station having pair of aligned electrical resistance welding electrodes defining an inter-electrode gap; passing a series of work-pieces to be welded through said gap; pinching each of said work-pieces between said electrodes in said gap while passing electrical current through said electrodes and said work-pieces to produce a plurality of welds at said welding station; occasionally moving said electrodes out of said welding station and into an electrode-alignment station adjacent said welding station to check alignment of said electrodes, said electrode-alignment station having an inspection fixture comprising a plate having a peripheral portion surrounding a central reference target against which alignment or misalignment is determined, and a plate-displacement detector; positioning said electrodes in said alignment station so as to locate said electrodes opposite said target; closing said electrodes so as to forcefully engage said plate and laterally displace said plate if said electrodes are misaligned, and to trigger an alarm if said plate is displaced sufficiently to engage said detector and thereby indicate that said electrodes are misaligned by a prescribed amount or more.

16. Welding method comprising the steps of providing a welding station having pair of aligned electrical resistance welding electrodes defining an inter-electrode gap; passing a series of work-pieces to be welded through said gap; pinching each of said work-pieces between said electrodes in said gap while passing electrical current through said electrodes and said work-pieces to produce a plurality of welds at said welding station; occasionally moving said electrodes out of said welding station and into an electrode-alignment station adjacent said welding station to check alignment of said electrodes, said electrode-alignment station having an inspection fixture comprising a plate having a peripheral portion surrounding a central reference target against which alignment or misalignment is determined, and an electrode a plate-displacement detector; positioning said electrodes in said alignment station so as to locate said electrodes opposite said target; closing said electrodes so as to forcefully engage and cant said plate if said electrodes are misaligned, and to trigger an alarm if said plate is slanted sufficiently to engage said detector and thereby indicate that said electrodes are misaligned by a prescribed amount or more.

* * * * *